(12) United States Patent
Nørskov et al.

(10) Patent No.: US 9,312,545 B2
(45) Date of Patent: Apr. 12, 2016

(54) PLATINUM AND PALLADIUM ALLOYS SUITABLE AS FUEL CELL ELECTRODES

(75) Inventors: Jens Nørskov, Los Altos, CA (US); Jeffrey Greeley, Glenwood, IL (US); Ifan Stephens, Copenhagen V (DK); Alexander S. Bondarenko, Bochum (DE); Tobias Johansson, Kgs. Lyngby (DK); Heine Anton Hansen, Menlo Park, CA (US); Thomas Jaramillo, Menlo Park, CA (US); Jan Rossmeisl, Vedbæk (DK); Ib Chorkendorff, Birkerød (DK)

(73) Assignee: DANMARKS TEKNISKE UNIVERSITET, Lyngby (DK)

(*) Notice: Subject to any disclaimer, the term of this patent is extended or adjusted under 35 U.S.C. 154(b) by 1032 days.

(21) Appl. No.: 13/383,512

(22) PCT Filed: Jul. 16, 2010

(86) PCT No.: PCT/DK2010/050193
§ 371 (c)(1),
(2), (4) Date: May 9, 2012

(87) PCT Pub. No.: WO2011/006511
PCT Pub. Date: Jan. 20, 2011

(65) Prior Publication Data
US 2012/0214083 A1    Aug. 23, 2012

Related U.S. Application Data

(60) Provisional application No. 61/226,462, filed on Jul. 17, 2009.

(30) Foreign Application Priority Data

Jul. 17, 2009  (EP) .................................... 09389502

(51) Int. Cl.
*H01M 4/86* (2006.01)
*H01M 4/92* (2006.01)
*H01M 8/10* (2006.01)

(52) U.S. Cl.
CPC ............ *H01M 4/921* (2013.01); *H01M 4/86* (2013.01); *H01M 4/926* (2013.01); *H01M 2008/1095* (2013.01); *Y02E 60/50* (2013.01)

(58) Field of Classification Search
CPC ....... H01M 4/86; H01M 4/921; H01M 4/926; H01M 2008/1095; Y02E 60/50
See application file for complete search history.

(56) References Cited

U.S. PATENT DOCUMENTS

| 4,202,934 A | 5/1980 | Jalan |
| 4,316,944 A | 2/1982 | Landsman et al. |

(Continued)

FOREIGN PATENT DOCUMENTS

| GB | 2 184 593 A | 6/1987 |
| GB | 2 242 203 A | 9/1991 |

(Continued)

OTHER PUBLICATIONS

Palenzona, A. and Cirafici, S. "The Pt-Y (Platinum-Yttrium) System", Bulletin of Alloy Phase Diagrams, vol. 11, No. 5, 1990.*

(Continued)

*Primary Examiner* — Carlos Barcena
*Assistant Examiner* — Lilia V Nedialkova
(74) *Attorney, Agent, or Firm* — Knobbe Martens Olson & Bear LLP (57) ABSTRACT

The present invention concerns electrode catalysts used in fuel cells, such as proton exchange membrane (PEM) fuel cells. The invention is related to the reduction of the noble metal content and the improvement of the catalytic efficiency by low level substitution of the noble metal to provide new and innovative catalyst compositions in fuel cell electrodes. The novel electrode catalysts of the invention comprise a noble metal selected from Pt, Pd and mixtures thereof alloyed with a further element selected from Sc, Y and La as well as any mixtures thereof, wherein said alloy is supported on a conductive support material.

27 Claims, 7 Drawing Sheets

(56) References Cited

U.S. PATENT DOCUMENTS

| | | | |
|---|---|---|---|
| 4,447,506 | A | 5/1984 | Luczak et al. |
| 4,711,829 | A | 12/1987 | Luczak et al. |
| 4,716,087 | A | 12/1987 | Ito et al. |
| 4,794,054 | A | 12/1988 | Ito et al. |
| 4,880,711 | A | 11/1989 | Luczak et al. |
| 5,024,905 | A | 6/1991 | Ito et al. |
| 5,079,107 | A | 1/1992 | Jalan |
| 5,183,713 | A | 2/1993 | Kunz |
| 5,225,391 | A | 7/1993 | Stonehart et al. |
| 5,338,430 | A | 8/1994 | Parsonage et al. |
| 5,856,036 | A | 1/1999 | Smotkin et al. |
| 5,876,867 | A | 3/1999 | Itoh et al. |
| 5,922,487 | A | 7/1999 | Watanabe et al. |
| 6,007,934 | A | 12/1999 | Auer et al. |
| 6,040,077 | A | 3/2000 | Debe et al. |
| 6,066,410 | A | 5/2000 | Auer et al. |
| 6,517,965 | B1 | 2/2003 | Gorer |
| 6,539,774 | B1 * | 4/2003 | Zinck et al. ............ 73/23.2 |
| 6,562,499 | B1 | 5/2003 | Naka et al. |
| 7,351,444 | B2 | 4/2008 | Wang et al. |
| 2004/0115507 | A1 | 6/2004 | Potter et al. |
| 2006/0019825 | A2 | 1/2006 | Devenney et al. |
| 2006/0263675 | A1 | 11/2006 | Adzic et al. |
| 2008/0057370 | A1 * | 3/2008 | Lee ............ H01M 4/8652 429/494 |
| 2009/0075142 | A1 | 3/2009 | Taylor et al. |

FOREIGN PATENT DOCUMENTS

| | | |
|---|---|---|
| JP | 10-214630 | 8/1998 |
| JP | 10-255831 A | 9/1998 |
| JP | 2007090157 A * | 4/2007 |
| KR | 2003-0030686 | 4/2003 |
| WO | WO 2006/086457 A2 | 8/2006 |
| WO | WO 2008/018926 A2 | 2/2008 |

OTHER PUBLICATIONS

Machine translation of Japanese Patent Publication No. JP 2007-090157 A, publication date Apr. 2007.*

"Intermetallic compound." Dictionary.com Unabridged. Random House, Inc., accessed: Jul. 9, 2015.*

Gasteiger, Hubert A., et al., "Activity benchmarks and requirements for Pt, Pt-alloy, and non-Pt oxygen reduction catalysts for PEMFCs" Applied Catalysis B: Environmental, 2005, pp. 9-35, vol. 56.

Green, Clare L. et al., "Determination of the Platinum and Ruthenium Surface Areas in Platinum—Ruthenium Alloy Electrocatalysts by Underpotential Deposition of Copper. I. Unsupported Catalysts" J. Phys. Chem. B, 2002, pp. 1036-1047, vol. 106.

Lefèvre, Michel et al., "Iron-Based Catalysts with Improved Oxygen Reduction Activity in Polymer Electrolyte Fuel Cells" Science, Apr. 3, 2009, pp. 71-74, vol. 324.

Shao, Minhua et al., "Synthesis and characterization of platinum monolayer oxygen-reduction electrocatalysts with Co-Pd core-shell nanoparticle supports" Electrochemistry Communications, 2007, pp. 2848-2853, vol. 9.

Stamenković, V. et al., "Surface Composition Effect in Electrocatalysis: Kinetics of Oxygen Reduction on Well-Defined $Pt_3Ni$ and $Pt_3Co$ Alloy Surfaces" J. Phys. Chem. B, 2002, pp. 11970-11979, vol. 106.

Stamenković, V. et al., "Surface segregation effects in electrocatalysis: kinetics of oxygen reduction reaction on polycrystalline $Pt_3Ni$ alloy surfaces" Journal of Electroanalytical Chemistry, 2003, pp. 191-199.

Stamenkovic, Vojislav R., et al., "Improved Oxygen Reduction Activity on $Pt_3Ni(111)$ via Increased Surface Site Availability" Science, Jan. 26, 2007, pp. 493-497, vol. 315.

Greeley, J. et al., "Alloys of platinum and early transition metals as oxygen reduction electrocatalysts" Nature Chemistry, Oct. 2009, pp. 552-556, vol. 1.

* cited by examiner

PLATINUM AND PALLADIUM ALLOYS SUITABLE AS FUEL CELL ELECTRODES

CROSS REFERENCE TO RELATED APPLICATIONS

This application claims the benefit and priority to and is a U.S. National Phase Application of PCT International Application Number PCT/DK2010/050193, filed on Jul. 16, 2010, designating the United States of America and published in the English language, which is an International Application of and claims the benefit of priority to European Patent Application No. 09389502.7, filed on Jul. 17, 2009, and U.S. Provisional Application No. 61/226,462, filed on Jul. 17, 2009. The disclosures of the above-referenced applications are hereby expressly incorporated by reference in their entireties.

FIELD OF THE INVENTION

The present invention concerns electrode catalysts used in fuel cells (e.g., in proton exchange membrane (PEM) fuel cells—also known as polymer electrolyte membrane fuel cells). The invention is related to the reduction of the noble metal content and the improvement of the catalytic efficiency by low level substitution of the noble metal to provide new and innovative catalyst compositions in fuel cell electrodes.

BACKGROUND OF THE INVENTION

Fuel cells combine hydrogen and oxygen without combustion to form water and to produce direct current electric power. The process can be described as reverse electrolysis. Fuel cells have potential for stationary and portable power applications; however, the commercial viability of fuel cells for power generation in stationary and portable applications depends upon solving a number of manufacturing, cost, and durability problems.

Electrochemical fuel cells convert fuel and an oxidant to electricity and a reaction product. A typical fuel cell consists of a membrane and two electrodes, called a cathode and an anode. The membrane is sandwiched between the cathode and anode. Fuel, such as hydrogen, is supplied to the anode, where an electrocatalyst catalyzes the following reaction: $2H_2 \rightarrow 4H^+ + 4e^-$.

At the anode, hydrogen separates into hydrogen ions (protons) and electrons. The protons migrate from the anode through the membrane to the cathode. The electrons migrate from the anode through an external circuit in the form of an electric current. An oxidant, in the form of oxygen or oxygen-containing air, is supplied to the cathode, where it reacts with the hydrogen ions that have crossed the membrane and with the electrons from the external circuit to form liquid water as the reaction product. The reaction is typically catalyzed by the platinum metal family. The reaction at the cathode occurs as follows: $O_2 + 4H^+ + 4e^- \rightarrow 2H_2O$.

The successful conversion of chemical energy into electrical energy in a primitive fuel cell was first demonstrated over 160 years ago. However, in spite of the attractive system efficiencies and environmental benefits associated with fuel-cell technology, it has proven difficult to develop the early scientific experiments into commercially viable industrial products. Problems have often been associated with lack of appropriate materials that would enable the cost and efficiency of electricity production to compete with existing power technology.

Proton exchange membrane fuel cells have improved significantly in the past few years both with respect to efficiency and with respect to practical fuel cell design. Some prototypes of fuel-cell replacements for portable batteries and for automobile batteries have been demonstrated. However, problems associated with the cost, activity, and stability of the electrocatalyst are major concerns in the development of the polymer electrolyte fuel cell. For example, platinum (Pt)-based catalysts are the most successful catalysts for fuel cell and other catalytic applications. Unfortunately, the high cost and scarcity of platinum has limited the use of this material in large-scale applications. The development of low temperature polymer electrolyte membrane fuel cells is furthermore severely hampered by the fact that the oxygen reduction reaction (ORR) is slow, resulting in low catalytic activities, even using platinum as a catalyst.

In addition, a problem with the use of platinum at the anode has been the poisoning of the catalyst surface by carbon monoxide impurities. On the cathode side, usually higher catalyst loadings have been utilised because methanol and other carbon containing fuel passing through the membrane react with oxygen at the cathode under catalytic effect of platinum, thereby decreasing the efficiency of the fuel cell.

To improve the catalytic efficiency and reduce the cost, other noble metals and non-noble metals are used to form Pt alloy as catalysts. Noble metals including Pd, Rh, Ir, Ru, Os, Au, etc. have been investigated. Non-noble metals including Sn, W, Cr, Mn, Fe, Co, Ni, Cu (U.S. Pat. No. 6,562,499) have also been tried. Different Pt-alloys were disclosed as catalysts for fuel cell applications. Binary alloys as catalysts include Pt—Cr (U.S. Pat. No. 4,316,944), Pt—V (U.S. Pat. No. 4,202,934), Pt—Ta (U.S. Pat. No. 5,183,713), Pt—Cu (U.S. Pat. No. 4,716,087), Pt—Ru (U.S. Pat. No. 6,007,934), Pt—Ti, Pt—Cr, Pt—Mn, Pt—Fe, Pt—Co, Pt—Ni, Pt—Cu (GB 2 242 203). Ternary alloys as catalysts include Pt—Ru—Os (U.S. Pat. 5,856,036), Pt—Ni—Co, Pt—Cr—C, Pt—Cr—Ce (U.S. Pat. No. 5,079,107), Pt—Co—Cr (U.S. Pat. No. 4,711,829), Pt—Fe—Co (U.S. Pat. No. 4,794,054), Pt—Ru—Ni (U.S. Pat. No. 6,517,965), Pt—Ga-(Cr, Co, Ni) (U.S. Pat. No. 4,880,711), Pt—Co—Cr (U.S. Pat. No. 4,447,506). Quaternary alloys as catalysts include Pt—Ni—Co—Mn, (U.S. Pat. No. 5,225,391), Pt—Fe—Co—Cu (U.S. Pat. No. 5,024,905).

However, for the PEM fuel cell to become a viable technology there is still a need to increase the catalytic activity or decrease the cost of the electrodes. Since the cost of the expensive ion conducting membrane separating the electrodes scales with the geometric area/active-site density of the electrode, the reduction of cost by using cheaper but less active electrodes with lower active-site density would be offset by the increasing cost of the membrane. Moreover, a decreased active site density cannot be offset by utilizing an electrode with a greater thickness: this would also impede the transport of reactive gases. As an example, reference should be made to the so-called Fe/C/N electrodes as disclosed inter alia by Lefevre et al., *Science*, 324, 71(2009). They have turnover frequencies, i.e. the number of electrons produced per active site per second, comparable to platinum electrodes, but still have lower active-site density.

Japanese patent application JP 10 214630 A discloses the use of binary alloys containing noble metals and rare earth metals in polymer electrolyte fuel cells. The alloys according to this application contain 20% or more by weight of "intermetallic compounds". This is interpreted to mean that 20% or more of the alloy exists in a single ordered phase. It is not entirely clear what constitutes the remaining part of the alloy, but it would appear to be the constituent metals in a ratio that is not very well defined. The entire alloy acts as the electrocatalyst.

Korean patent application KR 2003 0030686 discloses a metal cathode for an electron tube comprising a metal alloy having, as a main component, $Pt_5La$, $Pt_3Sc$, $Pt_2Ti$, $Pt_4Y$, $Pt_3Y$, $Pt_5Hf$, PtEr, or $Pt_5Ce$, and 0.1 to 20% by weight of one or more metals selected from the group consisting of molybdenum, tantalum and tungsten. The cathode further comprises 0.5 to 25% by weight of one or more elements selected from the group consisting of barium, strontium, and calcium. There is no indication, however, that the cathode may be useful for other uses than for an electron tube.

Accordingly, it is an object of the invention to provide an electrode alloy material with an increased catalytic activity towards oxygen reduction compared to pure platinum. It is furthermore an object of the invention to provide an electrode alloy with a lower cost compared to pure platinum while retaining a comparable active-site density. Another object of the invention is to provide an electrode alloy material whose activity enhancement over Pt is stable over extended periods of time.

SUMMARY OF THE INVENTION

The inventors of the present invention have found that the above described objects may be achieved by one aspect of the invention by providing an electrode comprising an alloy containing one or more noble metals selected from Pd, Pt and mixtures thereof, and at least one other element selected from the group consisting of Sc, Y and La, wherein said alloy is supported on a conductive support material.

In another aspect, the invention concerns an electrochemical cell, such as a fuel cell, comprising the electrode of the present invention.

In a further aspect, the invention relates to the use of an alloy according to the invention as an electrocatalyst.

In a further aspect, the invention relates to the use of an alloy according to the invention, wherein the alloy comprises a surface layer of pure noble metal—a layer described as noble metal skin (e.g. Pt skin) throughout this application.

It has been found that the electrodes of the present invention are up to twelve times more active than pure platinum. Furthermore, since the electrodes of the present invention are alloys with non-precious metals rather than pure platinum, the cost of the electrodes has been reduced while at the same time maintaining the active-site density.

DETAILED DESCRIPTION OF THE INVENTION

Definitions and Nomenclature
Alloy

An alloy is a partial or complete solid solution of one or more elements in a metallic matrix. Complete solid solution alloys give single solid phase microstructure, while partial solutions give two or more phases that may be homogeneous in distribution depending on thermal (heat treatment) history. Alloys usually have different properties from those of the component elements.

Intermetallic Compound

In the present context, the term "intermetallic compound" refers to those alloys which exist as a single ordered phase. Alloys don't necessarily need to be ordered or a single phase.

Electrocatalyst

In the context of the present invention, an "electrocatalyst" is a catalyst that participates in an electrochemical reaction. Catalyst materials modify and increase the rate of chemical reactions without being consumed in the process. Electrocatalysts are a specific form of catalysts that function at electrode surfaces or may be the electrode surface itself. When an electrocatalyst functions heterogeneously, it is typically a solid, such as a planar platinum surface or platinum nanoparticles. When an electrocatalyst functions homogeneously, such as a co-ordination complex or enzyme, it will be in the liquid phase. The electrocatalysts assist in transferring electrons between the electrode and reactants and/or facilitates an intermediate chemical transformation described by overall half-reactions.

Electrochemical Cell

In the context of the present invention, an "electrochemical cell" is a device used for generating an electromotive force (voltage) and current from chemical reactions, or the reverse, inducing a chemical reaction by a flow of current. The current is caused by the reactions releasing and accepting electrons at the different ends of a conductor. An "electrochemical cell" contains at least two electrodes and at least one electrolyte separating the electrodes. The electrolyte may be a liquid solution or an ion conducting membrane, which allows the passage of ions to reestablish charge neutrality over the whole cell without allowing any significant passage of electrons. Suitable electrolytes for electrochemical cells are known to the person skilled in the art. One example of a suitable electrolyte for certain types of electrochemical cells, such as a fuel cell, is Nafion®. An example of a suitable liquid electrolyte is phosphoric acid.

Fuel Cell

Figure 1:
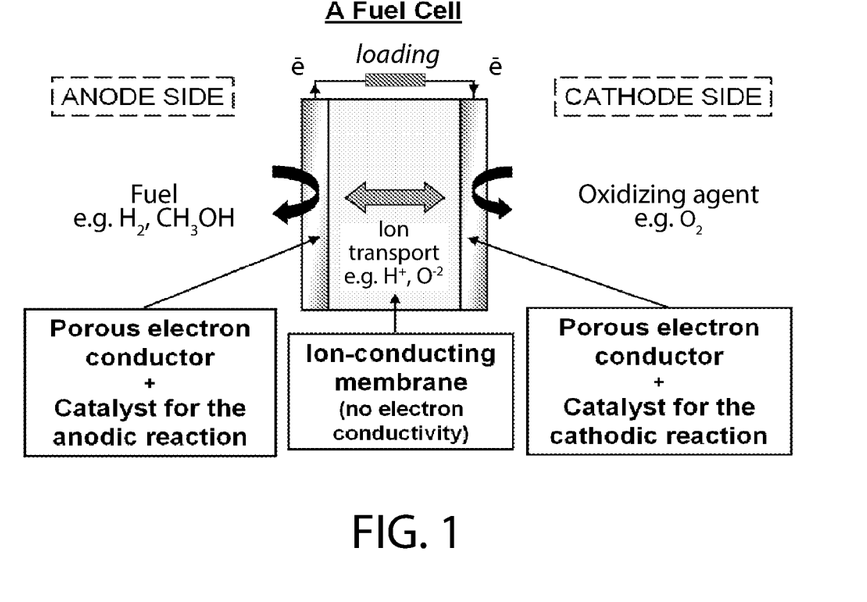
FIG. 1 is a schematic diagram showing a schematic of a fuel cell, in which the catalyst of the invention is used at the electrode of the fuel cell.

In the context of the present invention, a "fuel cell" is an electrochemical cell where the energy of a reaction between a fuel and an oxidant is converted directly into electrical energy. A typical fuel cell is illustrated in FIG. 1. Examples of fuels suitable for fuel cells are hydrogen gas, $H_2$, and methanol. A typical oxidant is oxygen gas, $O_2$.

Conductive Support

The term "conductive support material" or "conductive support" means a solid material with a resistivity at 20° C. of at the most 700 ohm meter, preferably at the most 1 ohm meter, most preferably at the most 0.001 ohm meter. The "conductive support material" as used in the present invention is suitable for use in an electrochemical cell, such as a fuel cell. In some of the embodiments of the invention it may be desirable that the conductive support material is permeable to gaseous molecules.

The term "conductive support material" or "conductive support" also includes non-conductive support materials with an electrode backing layer or any other means of conduction, wherein the means of conduction is attached to the non-conductive support material in a manner to bring it into contact with the electrocatalyst material to be deposited on the support material. One example of this type of "conductive support material" may be found in U.S. Pat. Nos. 5,338,430 and 6,040,077, both of which are incorporated herein in their entirety. U.S. Pat. No. 6,040,077 discloses PEM fuel cells with Pt or Pt/Ru deposited on an organic, non-conducting support material, so-called whiskers. The whiskers are acicular nanostructures grown on a substrate. The catalyst electrodes in U.S. Pat. No. 6,040,077 with the non-conductive support material are covered with ELAT™ electrode backing material for completing the electric circuit.

Anode and Cathode

An electrode in an electrochemical cell may be referred to as either an anode or a cathode. The anode is defined as the electrode, at which electrons leave the cell and oxidation occurs, and the cathode, as the electrode at which electrons enter the cell and reduction occurs. An electrode may become either an anode or a cathode depending on the voltage applied to the cell as well as the design of the cell.

Ion Conducting Membrane

In order to create an electrochemical circuit in an electrochemical cell, the electrodes may be separated by an ion conducting membrane. The membrane separating the electrodes must allow the diffusion of ions from one electrode to the other, but must keep the fuel and oxidant gases apart. It must also prevent the flow of electrons. Diffusion or leakage of the fuel or oxidant gases across the membrane can lead to undesirable consequences, such as short-circuiting or catalyst poisoning. If electrons can travel through the membrane, the device is fully or partially shorted out, and the useful power produced is eliminated or reduced. Suitable ionic conducting membranes include, but are not limited to Nafion, silicon oxide Nafion composites, polyperfluorosulfonic acids, polyarylene thioether sulfones, polybenzimidazoles, alkalimetal hydrogen sulfates, polyphosphazenes, sulfonated (PPO), silicapolymer composites, organo-amino anion exchange membranes and the like.

Ion conducting membranes suitable for use in fuel cells are generally very costly and the viability of using fuel cells commercially depends, at least in part, on minimising the amount of ion conducting membranes used in the fuel cell.

Nanoparticles

In applications, such as fuel cells, the electrocatalyst of the invention may advantageously be applied in the form of nanoparticles. In general, nanoparticles have the advantage of high surface areas per weight, which make them interesting in applications where high surface areas are advantageous, such as in catalysts. In the case of very costly catalysts, said surface area to weight ratio obviously becomes even more important.

The electrocatalyst material according to the present invention may be converted into nanoparticles suitable for use in fuel cells by applying methods well known to the person skilled in the art. Examples of such methods may inter alia be found in U.S. Pat. Nos. 5,922,487, 6,066,410, 7,351,444, US 2004/0115507, and US 2009/0075142.

Noble Metal Skin

In the context of the present invention, the term "noble metal skin" refers to the case when the alloys as used in the present invention have a relative intensity of noble metal of approximately 100% at or near the surface of the alloy, coinciding with a relative intensity of the one or more other metals of approximately 0%, as measure by Angle Resolved X-ray Photoelectron Spectroscopy (ARXPS). Beyond the noble metal skin, i.e. deeper into the surface of the alloy, the relative intensities of noble metal and the one or more further metals of the alloy will approach constant values corresponding to the bulk composition of the alloy, e.g. corresponding to $Pt_3Y$.

Embodiments of the Invention

The present invention concerns an electrode comprising a noble metal alloy. Noble metals are known in the art to be among the best catalysts in electrochemical cells, such as fuel cells or electrolysis cells. By instead using a noble metal alloy it is possible not only to decrease the cost of the electrode by substituting the very expensive noble metal with less expensive metals, but also to increase the activity of the electrode. Many efforts have been put into developing these alloys of noble metals, such as platinum and palladium, with other transition metals like Cr, Co, V and Ni. However, the operating potential at a given current density of fuel cells employing these prior art alloy catalysts decreases with time towards that of fuel cells employing pure Pt electrocatalysts. A review of these prior art alloy catalysts may be found in Gasteiger et al, *Appl. Catal. B-Environ* 56, 9-35 (2005). By using the present invention, noble metal alloys comprising elements selected from the group consisting of Sc, Y and La are surprisingly solving both problems by ensuring the stability together with an increased activity of the electrode. The activity of the $Pt_3Y$ electrode may be as much as an order of magnitude higher than the pure Pt electrode, as demonstrated in FIG. 7. It has furthermore been found that the alloys comprised in the electrodes of the invention form noble metal overlayers—so-called noble metal "skins"—at the surface of the alloy. This is important in order to ensure stability of the electrodes under the high potentials and acidic conditions of PEM fuel cells.

The invention relates to an electrocatalyst alloy supported on a conductive support. The support serves several different purposes. First, it serves the purpose of simply supporting the catalyst material, which may be deposited on the support in a very large area in a very thin layer. This holds the advantage of minimizing the needed mass of catalyst material to cover a large surface area of the catalyst. To optimize this effect, supports made with various surface porosities and roughness can increase the surface area of the support and hence the catalyst. Also more exotic supports, such as carbon nanotubes, have been investigated for these purposes. Furthermore, the support serves as a conducting material by providing a pathway for electronic (and in some cases ionic) conduction to and from the active sites of the catalyst. Finally, the support may also be gas permeable in order to facilitate the transport of gases to the catalyst.

In an embodiment of the invention, the noble metal used in the alloy is platinum. Platinum has long been known to be one of the best catalysts for the cathodic reaction. One of the drawbacks is the very high cost. Several attempts to improve cost efficiency have been made, such as depositing thin layers of Pt or alloying with cheaper materials or both. By alloying according to the present invention platinum can be used in very small amounts due to the increased activity of the alloys and the cheaper costs of substitution metals (Sc, Y, La).

The alloying of noble metals with metals selected from the group Sc, Y and La, has the advantage compared to alloys of the prior art, that they have favorable alloying energies. Typical alloy energies of such alloys (the heat of formation of the alloys—calculated as the difference between heat energy of the alloy and the heat energy of the substituent metals) lie in the range of −0.3 to 0.05 eV/atom, but the alloys according to the present invention have alloy energies up to −1 eV/atom and they are therefore thermodynamically much more stable.

One aspect of the present invention concerns an electrode comprising an alloy containing one or more noble metals selected from Pd, Pt, Au and mixtures thereof, and at least one other element selected from the group consisting of Sc, Y and La, wherein said alloy is supported on a conductive support material.

The noble metal of the alloy may be either platinum, gold or palladium, as well as any mixture thereof. In one embodiment, the noble metal is substantially pure platinum. In another embodiment, the noble metal is substantially pure palladium. In the embodiment of the invention, wherein the alloy contains a mixture of platinum and palladium, the mixture may comprise platinum and palladium in any ratio, such as in the atomic ratio 1:1.

Gold may be included in the electrode of the invention by depositing it on the surface of the alloy. As an example, gold may be deposited on the surface of a platinum/yttrium alloy.

In the context of the present invention, when referring to substantially pure metals or alloys, such as "substantially pure platinum", it is meant to encompass pure metals or alloys with a degree of impurities, which do not significantly alter the properties of the electrodes of the invention, e.g. the activity of the electrodes, within the normal measurement uncertainty limits applied by the skilled person.

The alloy of the electrode according to the present invention comprises one or more further elements, one or more non-noble metals, which are selected from the group consisting of scandium, yttrium and lanthanum, as well as any mixtures thereof. In one embodiment, said one or more further elements are selected from the group consisting of scandium, yttrium, lanthanum, and mixtures thereof. In a further embodiment, said further element is substantially pure yttrium. In another embodiment, said further element is substantially pure lanthanum.

In one embodiment of the invention, the alloy of the electrode consists of a substantially pure mixture of platinum and scandium. In another embodiment of the invention, the alloy of the electrode consists of a substantially pure mixture of platinum and yttrium. In yet another embodiment, the alloy of the electrode consists of a substantially pure mixture of platinum and lanthanum.

As mentioned above, the invention also concerns electrodes comprising alloys of mixtures of noble metals and/or further non-noble metals. Said alloys may therefore also be ternary alloys or quaternary alloys. Mixtures of five or more metals are also contemplated as being encompassed by the present invention.

In the electrode of the invention, the ratio between the one or more noble metals and the one or more further elements, the one or more non-noble metals, may vary. In a further embodiment, the present invention relates to an electrode, wherein the atomic ratio between the one or more noble metals and the one or more further elements is in the range 1:20 to 20:1, e.g. in the range 1:3 to 8:1, such as in the range 1:2 to 6:1, preferably in the range 1:1 to 5:1, more preferably in the range 2:1 to 4:1, and even more preferably in the range 2.5:1 to 3.5:1.

In a further embodiment, the present invention relates to an electrode, wherein the atomic ratio between the one or more noble metals and the one or more further elements is in the range 20:1 to 2.5:1, e.g. in the range 10:1 to 2.8:1, such as in the range 5:1 to 3:1.

Electrodes with an atomic ratio outside these ranges may be included in a PEM fuel cell. However, the excess of the noble or non-noble metals would be dissolved in the acidic electrolyte, leaving a catalyst with a composition inside the atomic ratio ranges indicated above.

Hence, the present invention encompasses an electrode comprising an alloy containing platinum and scandium in the atomic ratio between 1:20 and 20:1, e.g. between 1:3 and 8:1, such as between 1:2 and 6:1, preferably between 1:1 and 5:1, more preferably between 2:1 and 4:1, and even more preferably between 2.5:1 and 3.5:1. Furthermore, the present invention encompasses an electrode comprising an alloy containing platinum and yttrium in the atomic ratio between 1:20 and 20:1, e.g. between 1:3 and 8:1, such as between 1:2 and 6:1, preferably between 1:1 and 5:1, more preferably between 2:1 and 4:1, and even more preferably between 2.5:1 and 3.5:1.

In yet a further embodiment, the present invention relates to an electrode, wherein the alloy is $Pt_3Y$. In the context of the present invention, the term "$Pt_3Y$" is a mixture of Pt and Y with the atomic ratio 3:1. The skilled person may, while measuring the composition of an electrode according to this embodiment of the invention, arrive at a measured ratio deviating slightly from the exact ratio 3:1. It is however envisioned that electrodes having a measured composition substantially equal to 3:1 are also encompassed by the scope of this embodiment, as long as said deviation is within the normal uncertainty limits accepted by the person skilled in the art.

In yet a further embodiment, the present invention relates to an electrode, wherein the alloy is $Pt_5Y$. In the context of the present invention, the term "$Pt_5Y$" is a mixture of Pt and Y with the atomic ratio 5:1. The skilled person may, while measuring the composition of an electrode according to this embodiment of the invention, arrive at a measured ratio deviating slightly from the exact ratio 5:1. It is however envisioned that electrodes having a measured composition substantially equal to 5:1 are also encompassed by the scope of this embodiment, as long as said deviation is within the normal uncertainty limits accepted by the person skilled in the art.

In yet a further embodiment, the present invention relates to an electrode, wherein the alloy is $Pt_3Sc$. In the context of the present invention, the term "$Pt_3Sc$" is a mixture of Pt and Sc with the atomic ratio 3:1. The skilled person may, while measuring the composition of an electrode according to this embodiment of the invention, arrive at a measured ratio deviating slightly from the exact ratio 3:1. It is however envisioned that electrodes having a measured composition substantially equal to 3:1 are also encompassed by the scope of this embodiment, as long as said deviation is within the normal uncertainty limits accepted by the person skilled in the art.

In yet a further embodiment, the present invention relates to an electrode, wherein the alloy is $Pt_5La$ In the context of the present invention, the term "$Pt_5La$" is a mixture of Pt and La with the atomic ratio 5:1. The skilled person may, while measuring the composition of an electrode according to this embodiment of the invention, arrive at a measured ratio deviating slightly from the exact ratio 5:1. It is however envisioned that electrodes having a measured composition substantially equal to 5:1 are also encompassed by the scope of this embodiment, as long as said deviation is within the normal uncertainty limits accepted by the person skilled in the art.

As mentioned above, alloys may exist in a single ordered phase, which is referred to as an "intermetallic compound" in the present context. In a presently preferred embodiment, the alloys of the electrodes according to the invention contain at least 70% by weight intermetallic compound, such as at least 75% by weight, 80% by weight, 85% by weight, 90% by weight, or 95% by weight. In another embodiment, the alloy contains substantially only intermetallic compound.

As an example, the embodiment wherein the alloy is $Pt_3Y$ may contain at least 70% intermetallic compound, i.e. at least 70% of the $Pt_3Y$ is in a single ordered phase.

In a further embodiment, if the alloy of the electrode according to the invention is $Pt_5La$, $Pt_3Sc$, $Pt_4Y$, or $Pt_3Y$, the electrode does not also contain 0.1 to 20% by weight of one or more metals selected from the group consisting of molybdenum, tantalum and tungsten, and 0.5 to 25% by weight of one or more elements selected from the group consisting of barium, strontium, and calcium.

In a further aspect, the present invention relates to an electrochemical cell comprising the electrode according to the invention.

While the electrode of the invention is envisioned for use in any type of electrochemical cell, the inventors of the present invention have found that it is particularly useful in fuel cells in the conversion of chemical energy into electric energy. Thus, in one embodiment, the present invention relates to an electrochemical cell, wherein said electrochemical cell is a fuel cell. It has further been found that the electrodes of the present invention are especially useful in low-temperature fuel cells, i.e. fuel cells operating below 300° C., such as in the range 0° C. to 300° C.

The electrodes of the present invention may function either as the anode or the cathode of an electrochemical cell, depending on the voltage and design of the electrochemical cell. The electrodes of the invention are however preferably used as cathodes. In a preferred embodiment, the electrodes of the present invention are used as cathodes in a fuel cell.

In yet a further aspect, the present invention relates to the use of the alloy as defined herein as an electrocatalyst.

In still a further aspect, the present invention relates to a method for the production of electrical energy comprising the step of supplying an oxidizable fuel, such as $H_2$ or methanol, and an oxidant, such as $O_2$, to a fuel cell, such as a low-temperature fuel cell, as defined herein.

The different embodiments of the present invention may be combined with any of the other embodiments.

Throughout this document the terms "comprising" or "comprises" do not exclude other possible elements or steps. Also, the mentioning of references such as "a" or "an" etc. should not be construed as excluding a plurality.

EXAMPLES

Electrodes

Figure 2:
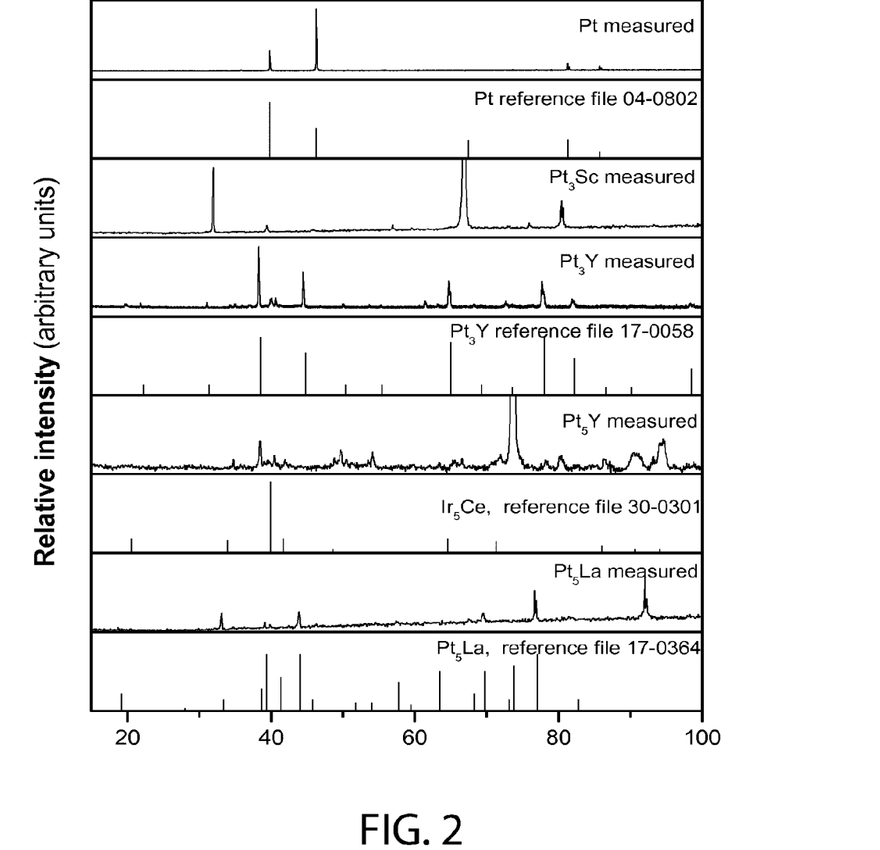
FIG. 2 contains X-ray diffraction traces of Pt, $Pt_3Sc$, $Pt_3Y$, $Pt_5Y$ and $Pt_5La$.

Each electrode was 5 mm in diameter (0.196 cm$^2$ geometric surface area). The alloys were produced as standard alloys according to techniques well known in the art of alloy production. Upon specification, several providers around the world will produce the alloys according to standard practice. One such provider is Mateck GmbH in Germany. The specification for the $Pt_3Y$, $Pt_5Y$, $Pt_5La$ and $Pt_3Sc$ electrodes used in these examples was: purity 99.95%, dia. 5 +/−0.05 mm×thickness 3 +/−0.5 mm, one side polished. The bulk composition of each electrode was verified using X-ray diffraction (XRD), using a PANalytical X'Pert PRO instrument. The results of these measurements are shown in FIG. 2, along with the reference patterns for Pt, $Pt_3Y$, $Pt_5La$ and $Ir_5Ce$. The patterns for the Pt, $Pt_3Y$ and $Pt_5La$ corresponded to the respective reference traces for these compounds, from the powder diffraction file database. There was no reference data available for $Pt_3Sc$ and $Pt_5Y$. However, the XRD traces of $Pt_3Sc$ and $Pt_5Y$ corresponded to the same crystal space groups as $Pt_3Y$ and $Ir_5Ce$. respectively. According to these data, the majority of each electrode was compromised of a single intermetallic phase, with no significant secondary phase present.

AES Analysis

Prior to electrochemical measurements, electrodes were preconditioned in an ultra high vacuum (UHV) chamber. The chamber was equipped with a Phi Auger electron spectroscopy (AES) facility. Each disc was sputter cleaned with $Ar^+$ until the AES spectra indicated that there was a negligible amount of C and O present. The AES spectra were recorded using a 5 keV accelerating voltage with a spot size of 150 μm, recorded over the range 30 to 1030 eV. These spectra were taken at several different locations over the metal surfaces. The sputtering was carried out with a 1 keV beam of $Ar^+$ ions, with a current of 15 μA, over a 6×6 mm area. The chamber was held at a base pressure below $1 \times 10^{-10}$ Torr.

Figure 3A:
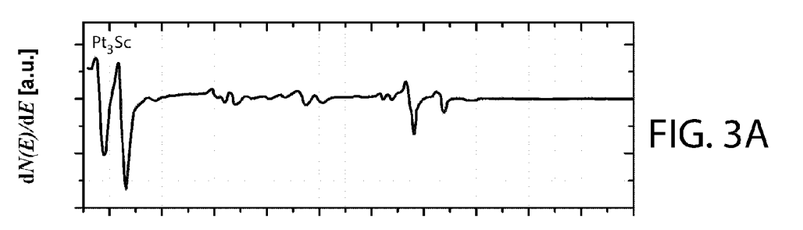
FIG. 3A contains AES spectra of Ar+sputter cleaned $Pt_3Sc$.
Figure 3B:
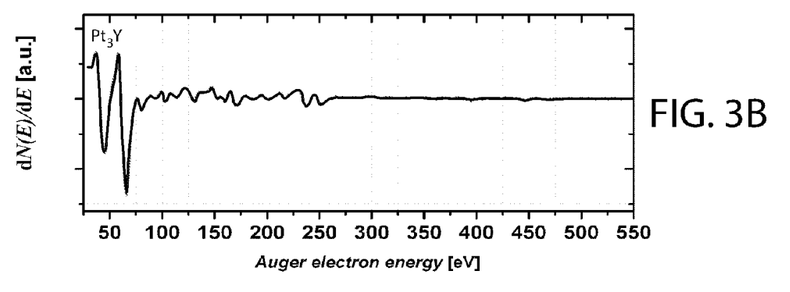
FIG. 3B contains AES spectra of Ar+sputter cleaned Pt3Y.

FIGS. 3A and B show the Auger spectra for the $Pt_3Sc$ and $Pt_3Y$ discs, respectively. Evidently all the peaks correspond to those characteristic of Pt and Y or Sc, with the exception of an insignificant O peak in the case of $Pt_3Sc$. According to these spectra, in the near surface region the composition of the $Pt_3Sc$ disc was ~70% Pt and ~30% Sc; and that of the Pt3Y disc was ~80% Pt, ~20% Y.

Electrochemical Measurements

Within a few seconds of removing the electrode from the UHV chamber, the clean electrode was protected using a droplet of ultrapure water (Millipore Milli-Q water, 18 MΩ cm$^{-1}$), saturated with $H_2$. It was then placed face down onto a wet polypropylene film, and pressed into the arbor of a rotating disc electrode (RDE).

The electrochemical experiments were performed with Bio-Logic Instruments' VMP2 potentiostat, controlled by a computer. The RDE assemblies were provided by Pine Instruments Corporation. A standard three-compartment glass cell was used. Prior to each measurement, the cell was cleaned in hot nitric acid (10 wt. %) and then rinsed and sonicated several times in ultrapure water. The electrolyte, 0.1 M $HClO_4$ (Aldrich, TraceSELECT® Ultra) was prepared from ultrapure water. The counter electrode was a Pt wire and the reference was a $Hg/Hg_2SO_4$ electrode; both were separated from the working electrode compartment using ceramic frits. Following each measurement, the potential of the reference electrode was checked against a reversible hydrogen electrode (RHE) in the same electrolyte. All potentials are quoted with respect to the RHE, and are corrected for Ohmic losses. The measurements were conducted at room temperature (23±2° C.). The RDE was immersed into the cell under potential control at 0.05 V into a $N_2$ (N5, Air Products) saturated electrolyte. The oxygen reduction reaction (ORR) activity measurements were conducted in an electrolyte saturated with $O_2$ (N55, Air Products). The Cu underpotential deposition (Cu UPD) experiments were carried out in the hanging meniscus configuration.

For the Cu underpotential deposition experiments, 0.1 M CuO (Aldrich, 99.9999%) was first dissolved in a solution of 0.3 M HClO$_4$, before adding an aliquot of this solution to the electrolyte to obtain a Cu$^{2+}$ concentration of 2 mM.

The underpotential deposition of Cu was used to estimate the real surface area of the electrodes, following the procedures of Green and Kucernak (*J. Phys. Chem. B* 106 (2002), 1036). In the presence of Cu$^{2+}$, the electrodes were first polarized to 1 V for 100 s to ensure there was no adsorbed Cu present, before being held at 0.3 V for a further 100 s to electrosorb a complete monolayer of Cu. The potential was finally scanned to 1 V to anodically desorb the Cu from the electrode. Assuming that each Pt surface atom is covered by a single adsorbed Cu atom, the charge for electro-desorption of Cu to Cu$^{2+}$ should be 420 μC cm$^{-2}$.

Angle Resolved X-ray Photoelectron Spectroscopy

X-ray photoelectron spectroscopy (XPS) is a surface analysis technique, usually implemented ex-situ under ultra high vacuum conditions (Chorkendorff and Niemantsverdriet, Concepts of Modern Catalysis and Kinetics, 2003). When an incident X-ray beam hits the surface, photoelectrons are emitted. The binding energy of these photoelectrons is characteristic of the elemental composition and chemical state of the atoms in the surface and near surface region. Varying the angle of the photoelectron analyser with respect to the normal to the sample allows different depth scales to be probed. Thus, angle resolved XPS allows a non-destructive depth profile to be obtained.

Example 1

Cu Underpotential Deposition

Figure 4A:
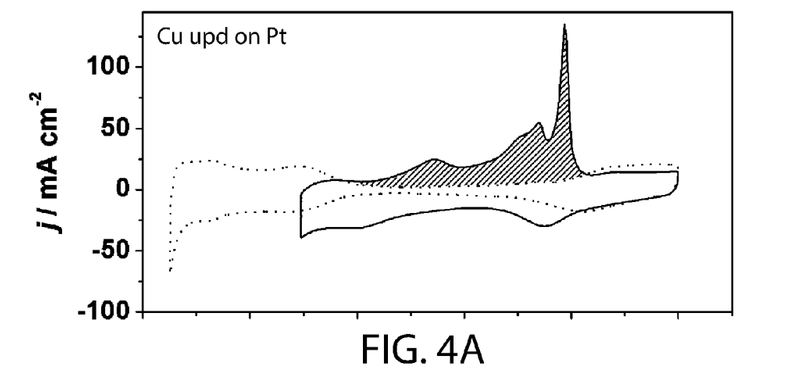
FIG. 4A contains cyclic voltammograms taken in the presence and absence of 2 mM $Cu^{2+}$, for Pt.
Figure 4B:
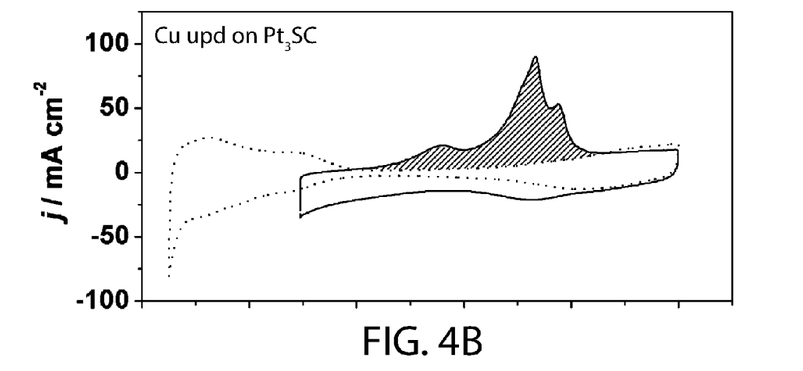
FIG. 4B contains cyclic voltammograms taken in the presence and absence of 2 mM Cu2+, for Pt3Sc.
Figure 4C:
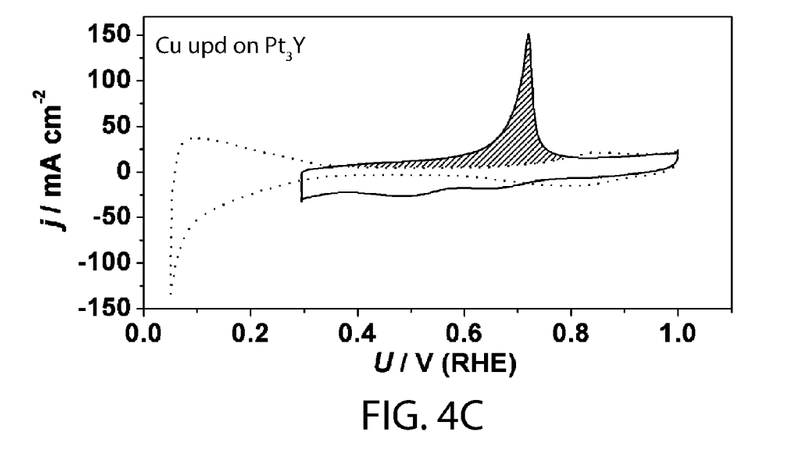
FIG. 4C contains cyclic voltammograms taken in the presence and absence of 2 mM Cu2+, for Pt3Y.

FIGS. 4A-C shows the voltammograms of Pt, Pt$_3$Sc and Pt$_3$Y in the presence and the absence of 2 mM Cu$^{2+}$. Measurements were taken in the hanging meniscus configuration at 20 mVs$^{-1}$ in 0.1 M HClO$_4$. The voltammograms taken in the presence of Cu$^{2+}$, shown with a solid line, were taken after a complete Cu monolayer was adsorbed at 0.3 V. The voltammograms taken in the absence of Cu$^{2+}$ are represented as dotted lines. The hatched area corresponds to the integrated charge for Cu stripping. Evidently, each electrode has a distinct voltammetric profile in the presence of Cu$^{2+}$. Despite these differences, the integrated Cu stripping charge for all voltammograms came to 83±2 μC, irrespective of the electrode composition. This suggests that the geometric and microscopic surface areas are equal (~0.2 cm$^2$). Should a significant amount of Sc or Y have remained at the surface of the electrode, underpotential deposition would not have been possible on these sites and a diminished charge would be required to form a monolayer. In case of dissolution of the Sc or Y component, it would have caused appreciable roughening of the surface. In such case, one would expect a much higher charge for Cu electro-desorption. Therefore, the data presented in FIGS. 4A-C support the conclusion that a smooth, stable Pt-skin has formed on the surface of the Pt$_3$Sc and Pt$_3$Y electrodes.

Example 2

Activities of the Electrodes

The activity of the catalysts for the ORR was measured by carrying out cyclic voltammograms in O$_2$ saturated solution, shown in FIG. 4(A). The onset for each electrode starts at ~1 V, and there is an initial exponential increase in the current, characteristic of kinetic control (i.e. where the current is not limited by diffusion). At lower potentials (~0.7 V<U<~0.95 V), the current approaches the mixed regime, where mass transport (diffusion) plays an increasingly important role. This potential range is the most interesting for fuel cell applications, the operating potential of fuel cells is typically in this range. At still lower potentials, the current reaches its diffusion limited value, ~5.8 mA cm$^{-2}$. In the mixed regime, the ORR activity of different catalysts can be compared by evaluating the half wave potential, U$_{1/2}$ (i.e. the potential at which the current reaches half its diffusion limited value). The Pt$_3$Sc shows a positive shift in U$_{1/2}$ of ~20 mV relative to Pt, whereas the Pt$_3$Y shows a positive shift of ~60 mV. These data show that both Pt$_3$Y and Pt$_3$Sc exhibit significant activity improvements over Pt. The positive shift in half wave potential means that the diffusion limited value is reached at a higher potential, i.e. that the kinetics are faster than for pure platinum.

Figure 6:
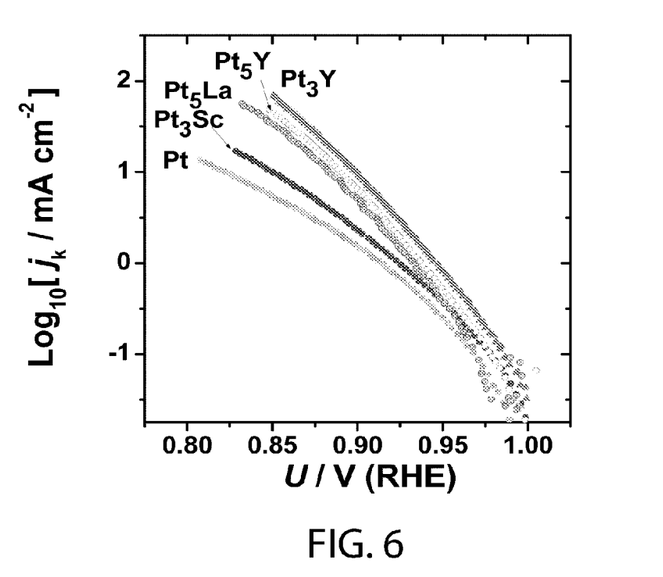
FIG. 6 is a graphical representation which illustrates the specific activity as a function of the electrode potential, U, for Pt, $Pt_3Sc$, $Pt_5Y$, $Pt_5La$, and $Pt_3Y$, expressed as a kinetic current density, $j_k$.

Modern PEM fuel cells have been designed for efficient delivery of reactive gases, thus mass transport effects are only of secondary importance; electrochemical kinetics are the primary cause of inefficiency (Gasteiger et al., *Appl. Catal. B-Environ.*, 56, 9 (2005)). In FIG. 6, the measured current density is corrected for mass transport to obtain the true kinetic current density, j$_k$, of the catalyst, as a function of potential, U.

The kinetic current density for oxygen reduction, j$_k$, was calculated using the following equation:

$$1/j_k = 1/j_{meas} - 1/j_d$$

where j$_{meas}$ is the measured current density, and j$_d$ is the diffusion limited current density.

The same catalyst ranking is found as that determined by the half wave potential: activity increases in the following order: Pt<Pt$_3$Sc<Pt$_3$Y.

Figure 7:
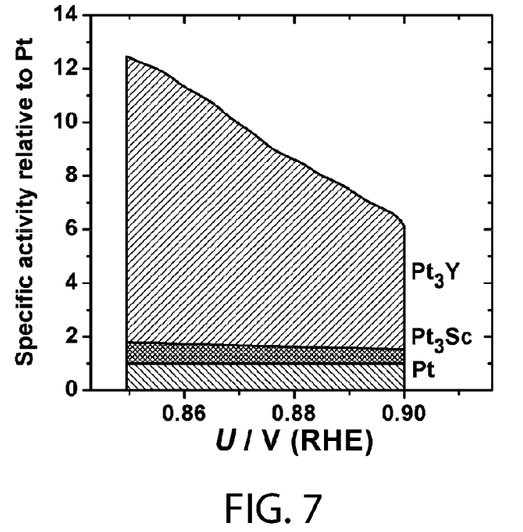
FIG. 7 is a graphical representation which illustrates the activity enhancement relative to Pt ($j_k/j_k^{Pt}$), from data shown in FIG. 6 and plotted on a linear scale.

In FIG. 7, the activity enhancement of Pt$_3$Sc and Pt$_3$Y relative to Pt is plotted as a function of potential. At 0.9 V, Pt$_3$Sc shows a 50% increase in specific activity over Pt, whereas Pt$_3$Y shows an improvement by a factor of 6. At 0.85 V the enhancement is approximately a factor of 2 for Pt$_3$Sc and 12 for Pt$_3$Y.

By extrapolation, the increase in activity is even higher at 0.7 V, the potential at which fuel cells are most commonly operated. Such a high increase in current at the same operating potential results in the increase of the output power with same factor. This is significant in the objective of achieving commercially viable fuel cells.

It has been found that the Pt$_3$Y electrode shows the highest ORR activity measured under the present conditions for any bulk, polycrystalline metallic surface in the prior art. The single crystal data for Pt$_3$Ni(111) (Stamenkovic et al., *Science*, 315, 493 (2007)) shows a similar activity to the present polycrystalline Pt$_3$Y sample, whereas the polycrystalline Pt$_3$Ni is not quite as active (Stamenkovic et al., *J. Phys. Chem. B*, 106, 11970 (2002)).

Figure 5A:
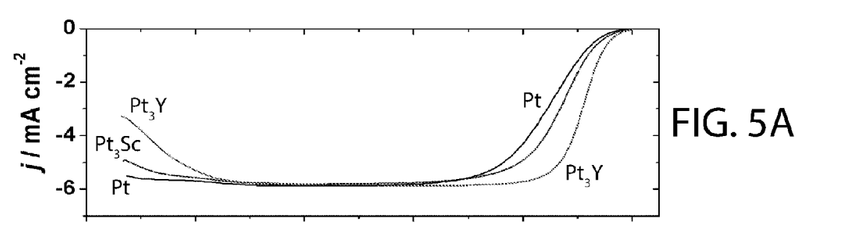
FIG. 5A shows Cyclic voltammograms of Pt, $Pt_3Sc$ and $Pt_3Y$ in $O_2$ saturated electrolyte (only the anodic sweep has been shown).
Figure 5B:
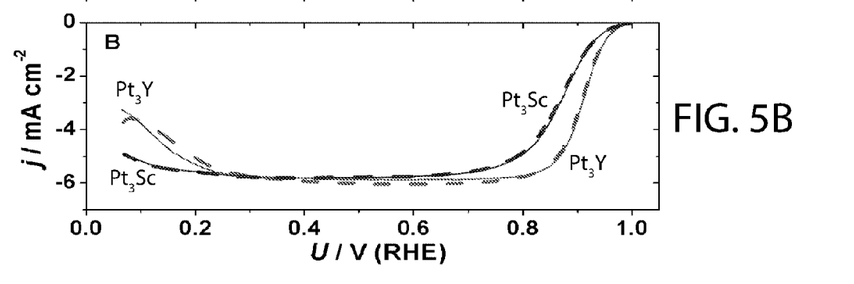
FIG. 5B shows, under the same conditions as FIG. 5A, comparing the first steady cycle (solid lines) and after 90 minutes of cycling (dashed lines), for Pt3Y and Pt3Sc only.

The alloy electrodes of the present invention are stable under continued cycling, as shown in FIG. 5(B), even though relatively harsh conditions (0.1 M HClO$_4$) were applied.

Example 3

ARXPS of Pt$_3$Y

Figure 8A:
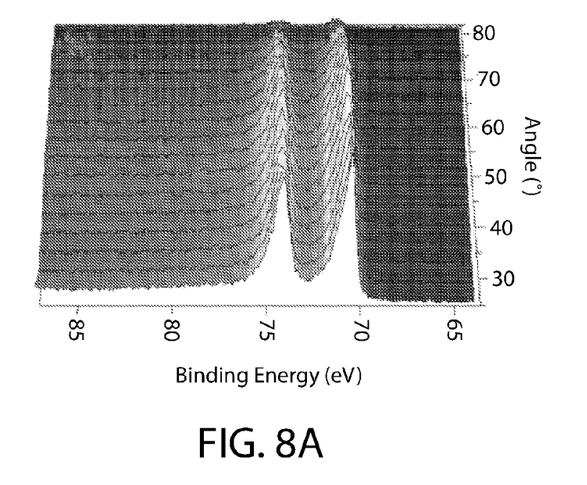
FIG. 8A is part of a graphical representation illustrating the Pt-skin of the alloy by an angle resolved XPS depth profile for $Pt_3Y$, showing a graph of angle vs. binding energy.
Figure 8B:
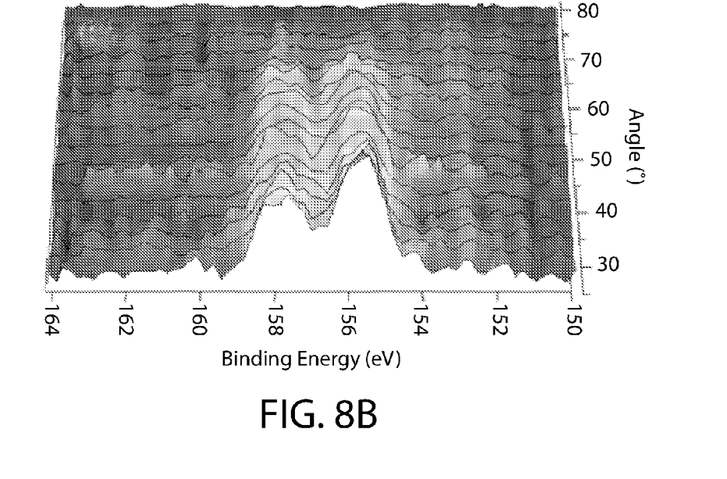
FIG. 8B is part of a graphical representation illustrating the Pt-skin of the alloy by an angle resolved XPS depth profile for Pt3Y, showing a graph of angle vs. binding energy.
Figure 8C:
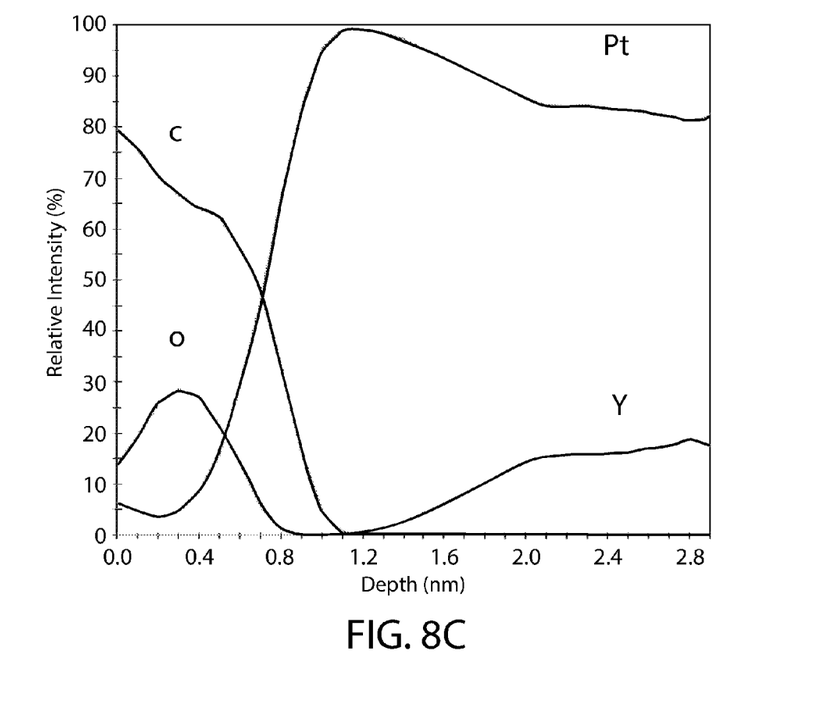
FIG. 8C is part of a graphical representation illustrating the Pt-skin of the alloy by an angle resolved XPS depth profile for Pt3Y, showing a graph of relative intensity vs. depth.

Evidence for a noble metal skin of the alloys as employed in the present invention is provided in FIGS. 8A-C, which is a depth profile of the Pt$_3$Y sample, constructed from Angle Resolved X-ray Photoelectron Spectroscopy data. This was taken following the measurement of the catalyst activity in an electrochemical cell (as described above, in Example 2). In this case the skin was formed by exposing the catalyst surface to acid electrolyte, where the base metal, Y, would dissolve spontaneously from the surface layer.

FIG. 8.*a* and *b* show the intensity of the Pt 4*f* and Y 3*d* peaks, as a function of the angle of the analyser to the surface normal. In the process of transferring the catalyst surface from the electrochemical cell to the XPS analysis chamber, the surface would have been contaminated with an adventitious layer of organic matter, arising from the laboratory atmosphere. This is unlikely to be present under reaction conditions. Consequently, both the Pt and Y peaks are very low in intensity at high angles, where the analysis mainly probes the immediate vicinity of the surface. However, both the Pt and the Y peaks increase in intensity with decreasing angle, as the measurement probes deeper below the surface.

The depth profile in FIG. 8.*c* is constructed by a model which combines the data shown in FIG. 8.*a* and 7.*b*, along with the corresponding peaks for C and O. Notably, the absolute values of the axes on FIG. 1.*c* are not exact, and dependent upon the inputs to the model used to fit the data. Consequently, the data should be interpreted qualitatively rather than quantitatively. At the surface, there is a very small Pt signal and no Y signal, and a large C and O signal, supporting the notion that there is an overlayer composed of organic contamination. However, the Pt peak increases up to a maximum of 100% relative intensity, approximately 1 nm into the surface, where the C, O and Y signal is negligible. This provides clear evidence that there is a skin at the catalyst surface, composed entirely of Pt. Below the skin, with increasing depth there is an increase in Y concentration, until both the Y and Pt reach a constant intensity, representative of the bulk composition.

Example 4

Activities of $Pt_5Y$ and $Pt_5La$

The kinetic current densities were measured and calculated in the same manner for $Pt_5Y$ and $Pt_5La$ as described in Example 2. The results are shown in FIG. 6 together with the results for Pt, $Pt_3Sc$, and $Pt_3Y$. At 0.9 V, $Pt_5La$ and $Pt_5Y$ show an improvement by a factor of 3 and 4, respectively. At 0.85 V the enhancement is approximately a factor of 6 and 8 for $Pt_5La$ and $Pt_5Y$, respectively.

The catalyst ranking is thus found to be $Pt_3Y > Pt_5Y > Pt_5La > Pt_3Sc > Pt$.

Although the present invention has been described in connection with the specified embodiments, it should not be construed as being in any way limited to the presented examples. The scope of the present invention is set out by the accompanying claim set.

The invention claimed is:

1. An electrode comprising an $Pt_3Y$ alloy wherein said alloy is supported on an electrically conductive support material, wherein said electrode does not also contain 0.1% to 20% by weight of one or more metals selected from the group consisting of molybdenum, tantalum and tungsten, and 0.5% to 25% by weight of one or more elements selected from the group consisting of barium, strontium, and calcium.

2. The electrode according to claim 1, wherein said alloy comprises at least 70% by weight intermetallic compound.

3. An electrochemical cell comprising the electrode according to claim 1 and an electrolyte, wherein said electrochemical cell is a fuel cell.

4. The electrochemical cell according to claim 3, wherein said electrode is the cathode.

5. The electrochemical cell according to claim 3, wherein the alloy of the electrode contains a noble metal skin on the surface.

6. The electrochemical cell according to claim 3, wherein the electrolyte is an ion conducting membrane.

7. An electrode comprising a $Pt_3Y$ alloy, wherein said alloy is supported on an electrically conductive support material, wherein said electrode does not also contain 0.1% to 20% by weight of one or more metals selected from the group consisting of molybdenum, tantalum and tungsten, and 0.5% to 25% by weight of one or more elements selected from the group consisting of barium, strontium, and calcium, and, wherein said alloy is crystalline.

8. The electrode according to claim 7, wherein said alloy comprises at least 70% by weight an intermetallic compound.

9. An electrochemical cell comprising the electrode according to claim 7 and an electrolyte, wherein said electrochemical cell is a fuel cell.

10. An electrode comprising a $Pt_5La$ alloy, wherein said alloy is supported on an electrically conductive support material, wherein said electrode does not also contain 0.1% to 20% by weight of one or more metals selected from the group consisting of molybdenum, tantalum and tungsten, and 0.5% to 25% by weight of one or more elements selected from the group consisting of barium, strontium, and calcium.

11. The electrode according to claim 10, wherein said alloy comprises at least 70% by weight intermetallic compound.

12. An electrochemical cell comprising the electrode according to claim 10 and an electrolyte, wherein said electrochemical cell is a fuel cell.

13. The electrochemical cell according to claim 12, wherein said electrode is the cathode.

14. The electrochemical cell according to claim 12, wherein the alloy of the electrode contains a noble metal skin on the surface.

15. The electrochemical cell according to claim 12, wherein the electrolyte is an ion conducting membrane.

16. An electrode comprising a $Pt_5Y$ alloy, wherein said alloy of said electrode is supported on an electrically conductive support material.

17. The electrode according to claim 16, wherein said alloy comprises at least 70% by weight intermetallic compound.

18. An electrochemical cell comprising the electrode according to claim 16 and an electrolyte, wherein said electrochemical cell is a fuel cell.

19. The electrochemical cell according to claim 18, wherein said electrode is the cathode.

20. The electrochemical cell according to claim 18, wherein the alloy of the electrode contains a noble metal skin on the surface.

21. The electrochemical cell according to claim 18, wherein the electrolyte is an ion conducting membrane.

22. An electrode comprising a $Pt_5La$ alloy, wherein said alloy is supported on an electrically conductive support material, wherein said electrode does not also contain 0.1% to 20% by weight of one or more metals selected from the group consisting of molybdenum, tantalum and tungsten, and 0.5% to 25% by weight of one or more elements selected from the group consisting of barium, strontium, and calcium, and, wherein said alloy is crystalline.

23. The electrode according to claim 22, wherein said alloy comprises at least 70% by weight an intermetallic compound.

24. An electrochemical cell comprising the electrode according to claim 22 and an electrolyte, wherein said electrochemical cell is a fuel cell.

25. An electrode comprising a $Pt_5Y$ alloy, wherein said alloy of said electrode is supported on an electrically conductive support material, and, wherein said alloy is crystalline.

26. The electrode according to claim 25, wherein said alloy comprises at least 70% by weight an intermetallic compound.

27. An electrochemical cell comprising the electrode according to claim 25 and an electrolyte, wherein said electrochemical cell is a fuel cell.

* * * * *